United States Patent
Narula

(10) Patent No.: US 11,350,458 B1
(45) Date of Patent: May 31, 2022

(54) SYSTEM AND METHOD FOR DYNAMIC SENSITIVITY CONTROL FOR INTERFERENCE AVOIDANCE

(71) Applicant: DELL PRODUCTS, LP, Round Rock, TX (US)

(72) Inventor: Harpreet Narula, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/118,471

(22) Filed: Dec. 10, 2020

(51) Int. Cl.
*H04L 43/08* (2022.01)
*H04W 74/08* (2009.01)
*H04W 72/08* (2009.01)

(52) U.S. Cl.
CPC ......... *H04W 74/0816* (2013.01); *H04L 43/08* (2013.01); *H04W 72/082* (2013.01)

(58) Field of Classification Search
CPC .. H04W 74/0816; H04W 72/082; H04L 43/08
See application file for complete search history.

(56) References Cited

U.S. PATENT DOCUMENTS

| 7,570,972 | B2 | 8/2009 | Pirzada et al. | |
|---|---|---|---|---|
| 8,532,670 | B2* | 9/2013 | Kim | G01S 19/16 455/26.1 |
| 10,172,014 | B2 | 1/2019 | Egner et al. | |
| 10,674,474 | B2* | 6/2020 | Poosamani | H04W 64/003 |
| 2016/0234644 | A1* | 8/2016 | Belghoul | G01S 5/0027 |
| 2018/0132278 | A1* | 5/2018 | Oteri | H04W 74/02 |
| 2018/0184303 | A1 | 6/2018 | Egner et al. | |
| 2020/0045636 | A1* | 2/2020 | Huang | H04W 52/0229 |
| 2020/0106579 | A1* | 4/2020 | Cherian | H04L 5/0032 |
| 2020/0178178 | A1* | 6/2020 | Huang | H04W 52/0229 |

\* cited by examiner

*Primary Examiner* — Robert C Scheibel
*Assistant Examiner* — Prenell P Jones
(74) *Attorney, Agent, or Firm* — Larson Newman, LLP

(57) ABSTRACT

An information handling system includes a transceiver and a processor. The processor detects a first RF signal of the RF signals received by the transceiver from a first access point (AP), and determines whether an energy level for the first RF signal is above a energy level threshold. If so, the processor determines whether basic service set (BSS) color of the first RF signal is the same as BSS color of a second RF signal from a second AP. If not, the RF signal is coming from a different network. The processor calculates distance to the second AP, determines and configures receive sensitivity energy level threshold based on the calculated distance. If the energy level of the first RF signal is less than the receive sensitivity energy level threshold, the processor continues to receive RF signals from the second AP, and continue to reject RF signals from the interfering network.

20 Claims, 7 Drawing Sheets

US 11,350,458 B1

SYSTEM AND METHOD FOR DYNAMIC SENSITIVITY CONTROL FOR INTERFERENCE AVOIDANCE

FIELD OF THE DISCLOSURE

The present disclosure generally relates to information handling systems, and more particularly relates to dynamic sensitivity control for interference avoidance.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a transceiver and a processor. The transceiver may receive and transmit radio frequency (RF) signals. The processor may detect a first RF signal of the RF signals from a first access point, and determine whether an energy level for the RF signal is above a energy level threshold. In response to the energy level of the first RF signal being above the energy level threshold, the processor may determine whether a first basic service set (BSS) color of the first RF signal is the same as BSS color of a second RF signal of the RF signals received from a second access point. In response to the first BSS color being different than the second BSS color, the first RF signal is considered to be coming from a different network. The processor may calculate a distance between the information handling system and the second access point. The processor may energy level threshold determine and configure a receive sensitivity energy level threshold based on the distance between the information handling system and the first access point. The processor may determine whether the energy level for the first RF signal is above or below the receive sensitivity energy level threshold. In response to the energy level for the first RF signal being below the receive sensitivity energy level threshold, the processor may determine that the first access point is an interfering access point. The processor may also continue to disregard the first RF signal and other RF signals from the first access point, and may continue to receive other RF signals from the second access point.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
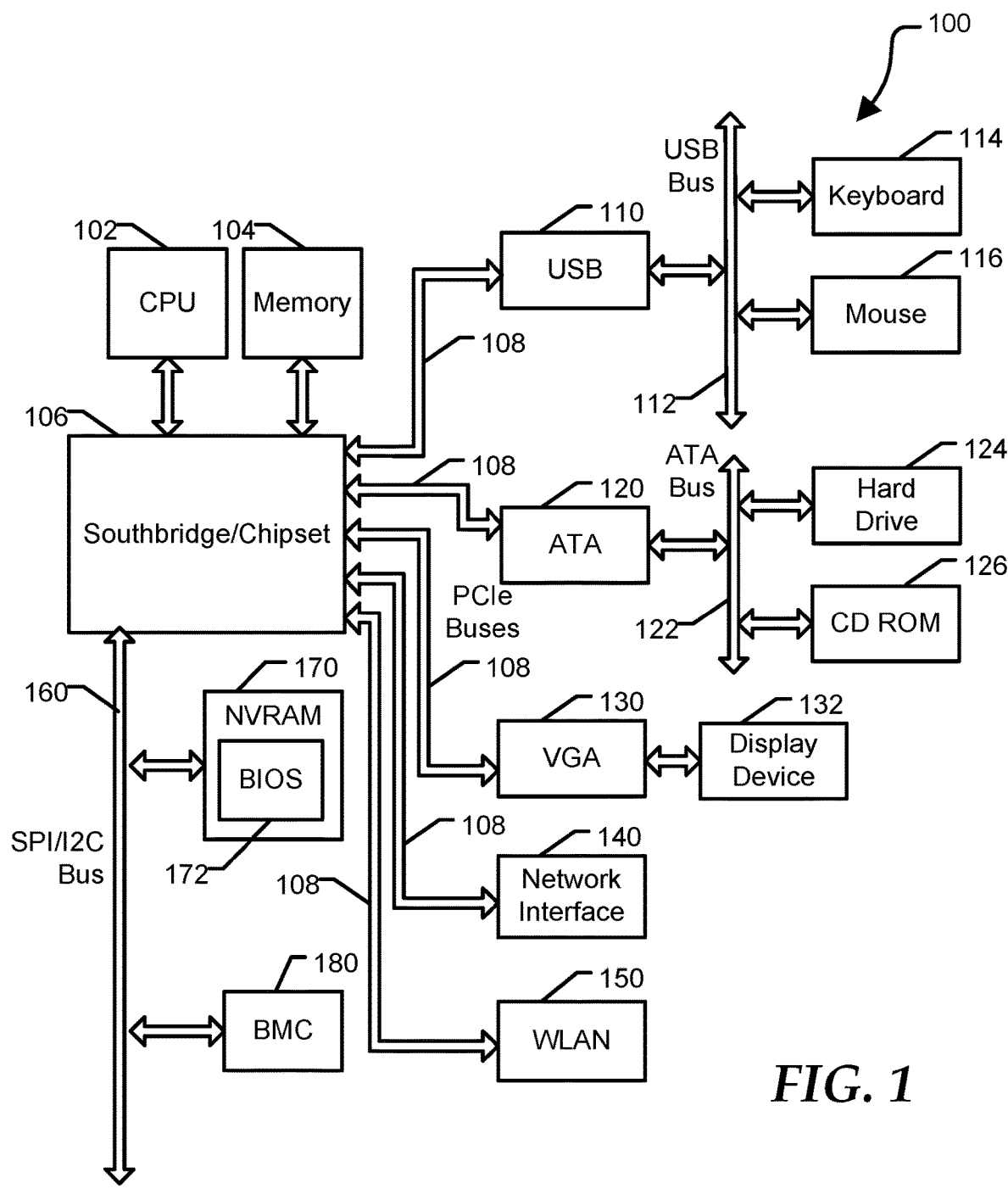
FIG. 1 is a block diagram of a general information handling system according to an embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a southbridge/chipset 106, one or more PCIe buses 108, a universal serial bus (USB) controller 110, a USB 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of southbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 100 may be any suitable device including, but not limited to, information handling system 100 and servers 112, 114, and 116 of FIG. 1. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
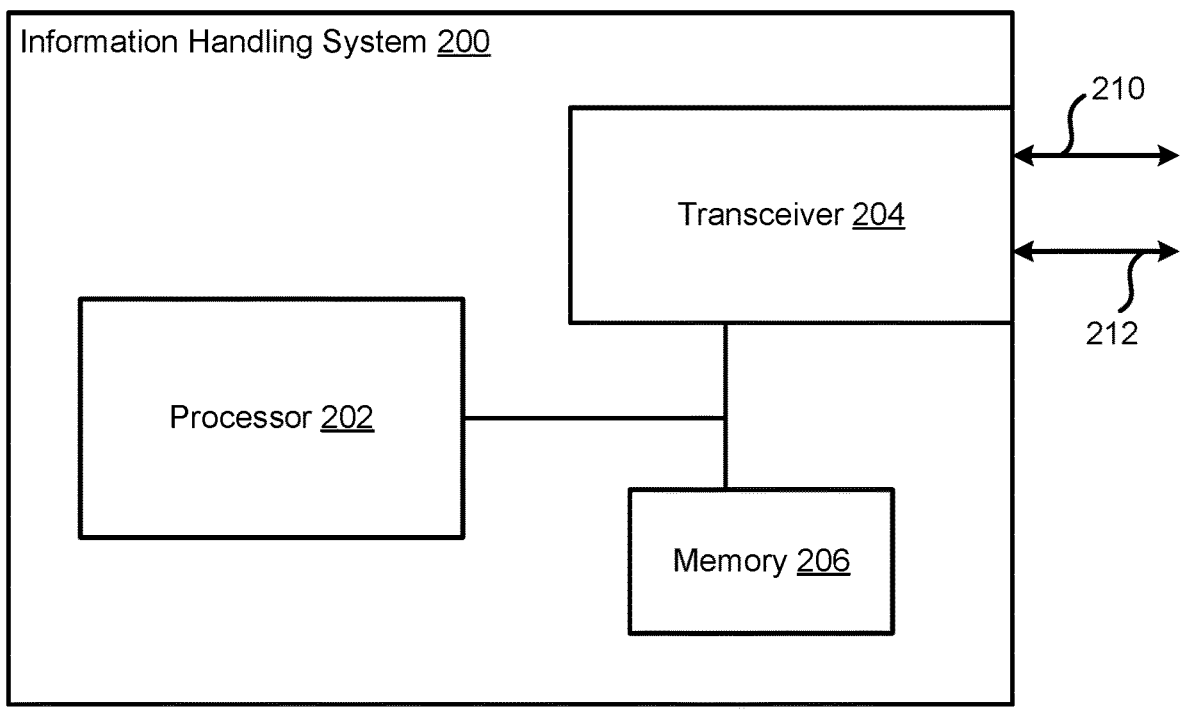
FIG. 2 is a diagram of an information handling system according to at least one embodiment of the present disclosure.

FIG. 2 illustrates an information handling system according to at least one embodiment of the present disclosure. Information handling system 200 includes a processor 202, transceiver 204, and a memory 206. In an example, transceiver 204 may be any suitable type of transceiver including, but not limited to, a wireless fidelity (WiFi) transceiver. In certain examples, transceiver 204 may receive and transmit any suitable number radio frequency (RF) signals including, but not limited to, RF signals 210 and 212. Memory 206 may store code to be executed by processor 202, which in turn may cause the processor to perform one or more of the operations disclosed herein.

Processor 202 may enable smart switching of information handling system 200 within a particular WiFi network. For example, processor 202 may switch communication of transceiver 204 between access points (APs) within the wireless network to optimize connectivity of information handling system 200 to APs in the network. Processor 202 may perform quality of service (QoS) based wireless traffic prioritization, multi-link optimizations of connectivity. In certain examples, the multi-link connectivity may include dual wireless connections, wireless plus cellular, wireless plus wired, and the like. In an example, information handling system 200 may include additional components without varying from the scope of this disclosure.

During operation, information handling system 200 may transmit RF signal to an AP via transceiver 204. In an example, multiple information handling systems may connect to and communicate with a single AP. In this example, each information handling system must wait for another information handling system to complete communication with the AP before the information handling system can transmit the RF signal. Also, multiple APs may connect to and communicate with a single information handling system. Each AP must wait for another AP to complete communication with the information handling system before the AP can transmit the RF signal. The collision avoidance between the signals may be achieved by carrier sense with multiple access collision avoidance (CSMA/CA). In a multi-AP environment, CSMA/CA may result in significant overhead and reduced airtime utilization of RF signal transmissions between information handling systems and APs within the environment. The CSMA/CA operations may consume a lot of WiFi bandwidth, which in turn may result in a bad network experience. In an example, processor 202 may improve information handling system 200 by providing dynamic RF sensitivity control to provide interference avoidance within the environment.

Figure 3:
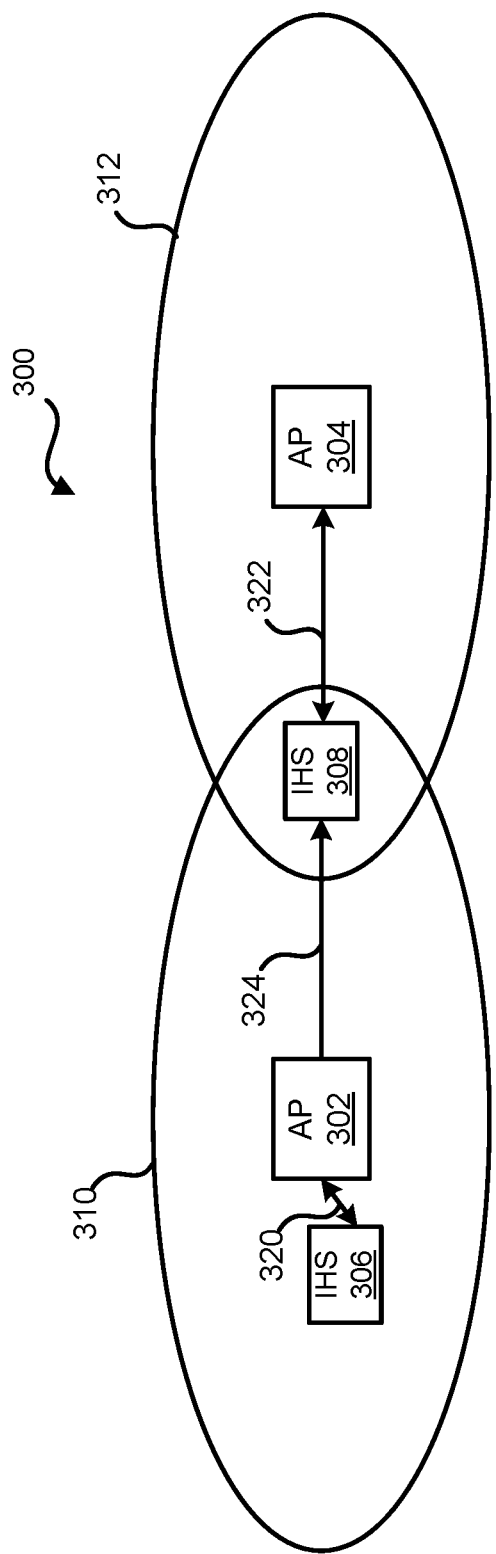
FIGS. 3 and 4 are diagrams of a portion of a wireless wide area network according to at least one embodiment of the present disclosure.
Figure 4:
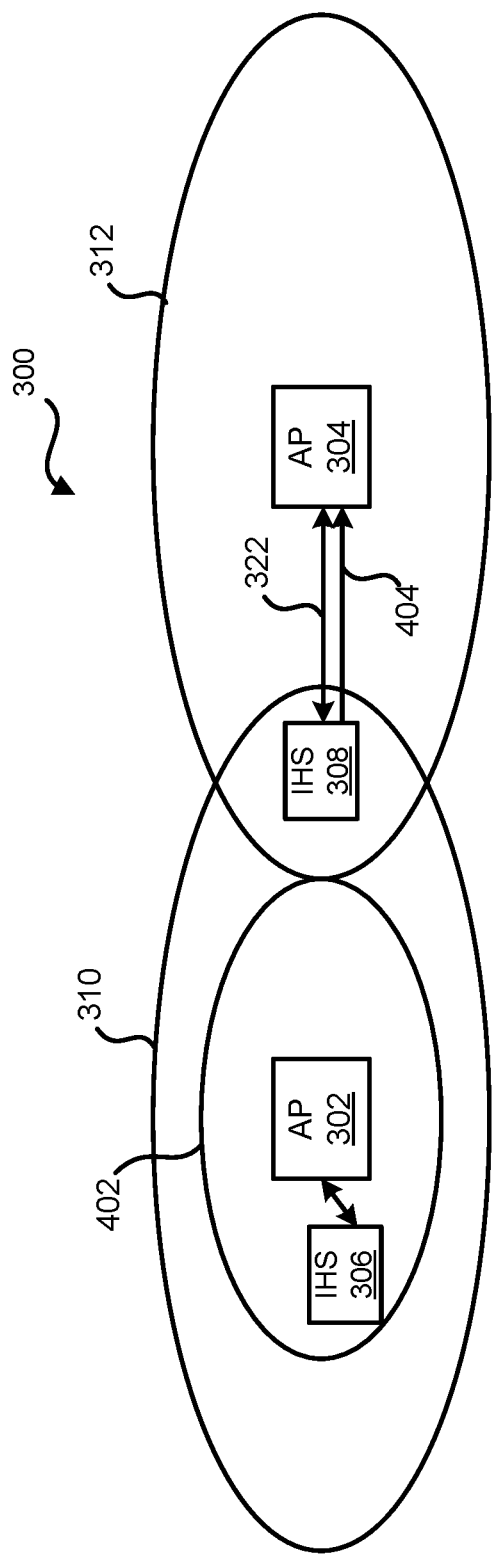

FIGS. 3 and 4 are diagrams of a portion of a wireless wide area network (WLAN) 300 according to at least one embodiment of the present disclosure. WLAN 300 includes APs 302 and 304 and information handling systems 306 and 308. In an example, AP 302 may transmit RF signals with varying signal strengths, such that information handling systems, such as information handling systems 306 and 308, within a range 310 may be able to receive the RF signals. Similarly, AP 304 may transmit RF signals with varying signal strengths, such that information handling systems, such as information handling system 308, within a range 312 may be able to receive the RF signals.

In an example, information handling system 306 may communicate with AP 302 via an RF signal 320. Information handling system 308 may communicate with AP 304 via an RF signal 322. In certain examples, information handling system 308 may be located within both signal range 312 of AP 304 and signal range 310 of AP 302. In an example, while information handling system 308 is communicating with AP 304, the information handling system may receive an RF signal 324. Information handling system 308 may identify RF signal 324 as a co-channel signal with respect to RF signal 322. In this situation, RF signal 324 may cause co-channel interference within information handling system 308. In certain examples, the operations performed by information handling system 308 may be executed by a processor, such as processor 202 of FIG. 2, and a transceiver, such as transceiver 204 of FIG. 2.

In response to identifying RF signal 324 as a co-channel signal, information handling system 308 may perform one or more operations based on a co-channel interference strength of the RF signal. For example, based on a co-channel interference strength of RF signal 324, information handling system 308 may determine whether a signal strength sensitivity within the information handling system should be adjusted. Information handling system 308 may determine a co-channel interference strength of RF signal 324. If information handling system 308 determines RF signal 324 has a weak co-channel interference strength, the information handling system may ignore the RF signal and implement co-channel concurrent transmission. These operations by information handling system 308 may improve throughput in the information handling system.

In an example, information handling system 308 may perform any suitable operation to determine whether the energy level or signal strength of RF signal 324 is above a particular threshold. The particular threshold may be a clear channel assessment—signal detect (CCA-SD) threshold. Information handling system 308 may determine the signal strength of RF signal 324 by utilizing a received signal strength indicator (RSSI) value. In response to the RSSI of RF signal 324 being below the CCA-SD threshold, information handling system 308 may disregard the RF signal.

In response to RSSI of RF signal 324 being greater than or equal to the CCA-SD threshold, information handling system 308 may determine whether the RF signal is able to demodulate the RF signal traffic. For example, information handling system 308 may determine whether RF signal 324 includes any physical layer convergence procedure (PLCP) errors. In an example, PLCP errors may be any suitable error in a particular frame of RF signal 324 including, but not limited to, a data rate errors and packet length errors.

If information handling system 308 determines no PLCP errors exist in a frame of RF signal 324, the information handling system may perform one or more suitable operations to determine a basic service set (BSS) color of the frame. For example, information handling system 308 may read a frame header to determine the color of the frame. In an example, information handling system 308 may utilize BSS coloring of RF signal 324 to identify co-channel interference of the RF signal. BSS color for a frame of RF signal 324 may be located in a frame header. In an example, the BSS color may be a numerical identifier of the BSS, and the BSS color may be utilized to differentiate between BSSs when the different information handling systems 306 and 308 and/or APs 302 and 304 transmit on the same channel.

In an example, the BSS color may be located in a BSS color information field of a high efficiency operation element. Within the BSS color information field multiple bits to indicate the BSS color, a partial BSS color, and whether the BSS color is disabled. The high efficiency operation element may be located within any suitable frame of RF signal 324 including, but not limited to, a beacon frame, a probe response frame, and association/re-association frames. In an example, information handling system may receive one or more of the frames to maintain a WiFi connection with an AP.

If the BSS color of RF signal 324 is the same as the BSS color of RF signal 322, information handling system 308 may determine that the frame of RF signal 324 is an intra-BSS frame. In this situation, RF signal 324 may not be from AP 302, but instead may be a signal from AP 304 that information handling system 308 is already connected to and communicating with. When the frame of RF signal 324 is an intra-BSS frame, information handling system 308 may perform normal CSMA/CA processing operations on the frame of the RF signal.

If the BSS color of RF signal 324 is different from the BSS color of RF signal 322, information handling system 308 may determine that the frame of RF signal 324 is an inter-BSS frame. An inter-BSS frame is a frame from an AP, such as AP 302, that information handling system 308 is not currently connected to and not communicating with, such as an AP from a different network. In an example, an inter-BSS frame may be associated with an overlapping BSS (OBSS) signal. In this example, in response to RF signal 324 being an OBSS signal, the RF signal may create co-channel interference within information handling system 308. Information handling system 308 may prevent the co-channel interference by updating an OBSS-SD threshold. In an example, the OBSS-SD threshold may be a receive sensitivity energy level threshold for information handling system 308 to receive and process RF signals.

Referring now to FIG. 4, the updated OBSS-SD threshold may result in an effective range 402 of AP 302. In an example, range 402 may result information handling system 308 not being located in within the effective transmission range of AP 302. Information handling system 308 may perform one or more operations to update the OBSS-SD threshold. For example, information handling system 308 may utilize a distance between the information handling system and AP 304 to determine the updated OBSS-SD threshold. In certain examples, the distance may be calculated by any suitable manner including, but not limited to, fine timing measurement (FTM). For example, information handling system 308 may provide a FTM request 404 to AP 304. FTM request 404 may initiate the distance calculation as will be described with respect to FIG. 5.

Figure 5:
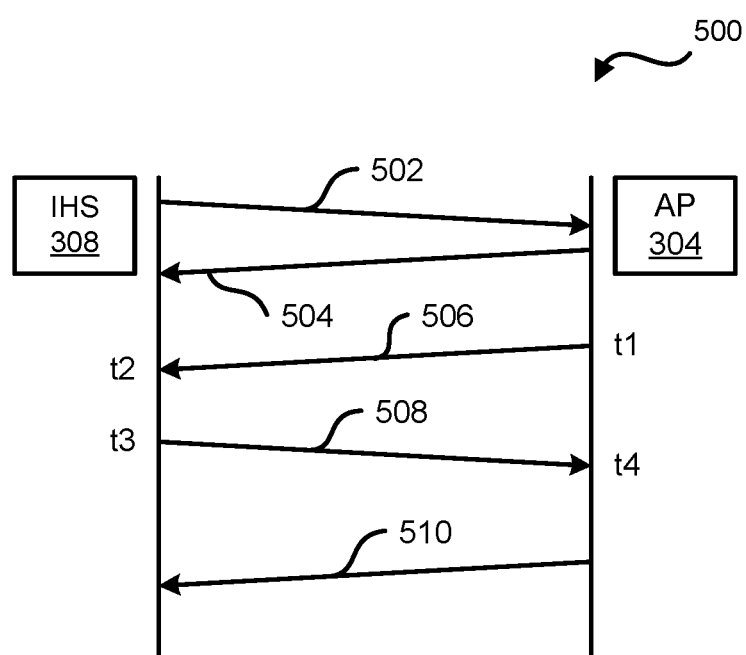
FIG. 5 shows an operational flow to determine fine timing measurement between an information handling system and an access point according to at least one embodiment of the present disclosure.

FIG. 5 is an operational flow 500 to determine fine timing measurement (FTM) between information handling system 308 and AP 304 according to at least one embodiment of the present disclosure. In an example, information handling system 308 may utilize an adaptive CCA to update an inter-BSS threshold or OBSS-SD threshold. At step 502, information handling system 308 may provide a FTM request to AP 304. At step 504, AP 304 may provide an FTM request response to indicate that the FTM operation may be performed. At step 506, AP 304 may provide a FTM ping to information handling system 308. In an example, the FTM ping may be sent from AP 304 at time t1, and the FTM ping may be received at information handling system 308 at time t2. In certain examples, the FTM ping may include a time stamp for time t1.

At step 508, information handling system 308 sends an acknowledgement pong to AP 304. In an example, the acknowledge pong may be sent from information handling system 308 at time t3, and the acknowledge pong may be received at AP 304 at time t4. In certain examples, the acknowledgement pong may include multiple time stamps for time t1, time t2, and time t3. Based on the time stamps in the acknowledgement pong, AP 304 and/or information handling system 308 may calculate FTM for the distance between the AP and the information handling system. An exemplary equation for the FTM is provided in equation 1 below:

$$2*distance=((t4-t1)-(t3-t2))*c \qquad \text{EQ. 1}$$

Utilizing equation 1 above, AP 304 may calculate twice the distance between the AP and information handling system 308 by determining the total round trip amount of time of the FTM ping and the acknowledgement pong, such as t4-t1, and determining a turn around amount of time in the information handling system. In an example, the turn around amount of time may be the amount of elapsed time from when information handling system 308 receives the FTM ping, while the information handling system processing the FTM ping, and ending when the information handling system provides the acknowledgement pong. The turn around amount of time may be subtracted from total round trip amount of time to determine the travel time for both the FTM ping and the acknowledgement pong, and this travel time may be multiplied by the speed of light, c, to determine twice the distance between AP 304 and information handling system 308.

At step 510, AP 304 provides the FTM distance measurement to information handling system 308. In an example, AP 304 may provide the FTM time stamps, such as time t1, time t2, time t3, and time t4, to information handling system 308 at step 510. In this example, information handling system 308 may utilize the time stamps to calculate the distance between the information handling system and AP 304 as described above. In certain examples, information handling system 308 and AP 302 may perform substantially similar operations to utilize FTM to calculate a distance between the information handling system and AP 302.

Figure 6:
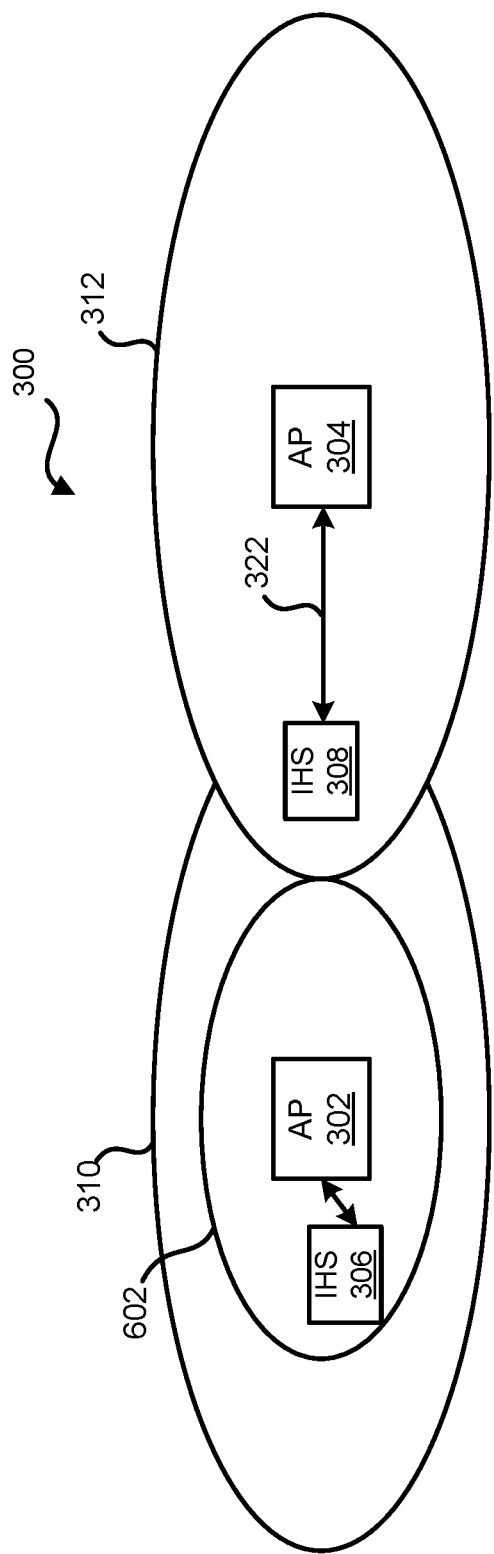
FIG. 6 is a diagram of a portion of a wireless wide area network according to at least one embodiment of the present disclosure.

FIG. 6 illustrates a portion of WLAN 300 according to at least one embodiment of the present disclosure. WLAN 300 includes APs 302 and 304 and information handling systems 306 and 308. As described above with respect to FIG. 5, the distance between AP 302 and information handling system 308 may be calculated, as well as the distance between AP 304 and information handling system 308. Based on the calculated FTM distance or distances, information handling system 308 may calculated an inter-BSS threshold and an intra-BSS threshold.

In an example, information handling system 308 may update the inter-BSS or OBSS-SD threshold. The OBSS-SD threshold may be lowered from any suitable value to another. For example, the OBSS-SD threshold within information handling system 308 may be lowered from −82 dBm to −62 dBm. The change in the OBSS-SD threshold may cause information handling system 308 to ignore RF signals outside range 602 of AP 302, such that RF signal 324 from AP 302 in an interfering network does not lower a throughput of the information handling system. While updating a received signal threshold has described with respect to a single interfering signal from AP 302, one of ordinary skill in the art would recognize that substantially similar operations may be apply to any number of interfering signals from any suitable number of interfering APs without varying from the scope of this disclosure. In an example, if multiple detected RF signals have a different BSS color as compared to a BSS color of an RF signal from AP 304 already communicating with information handling system 308, the receive sensitivity energy level threshold may be updated based on a distance between the information handling system and the AP already communicating with the information handling system.

Figure 7:
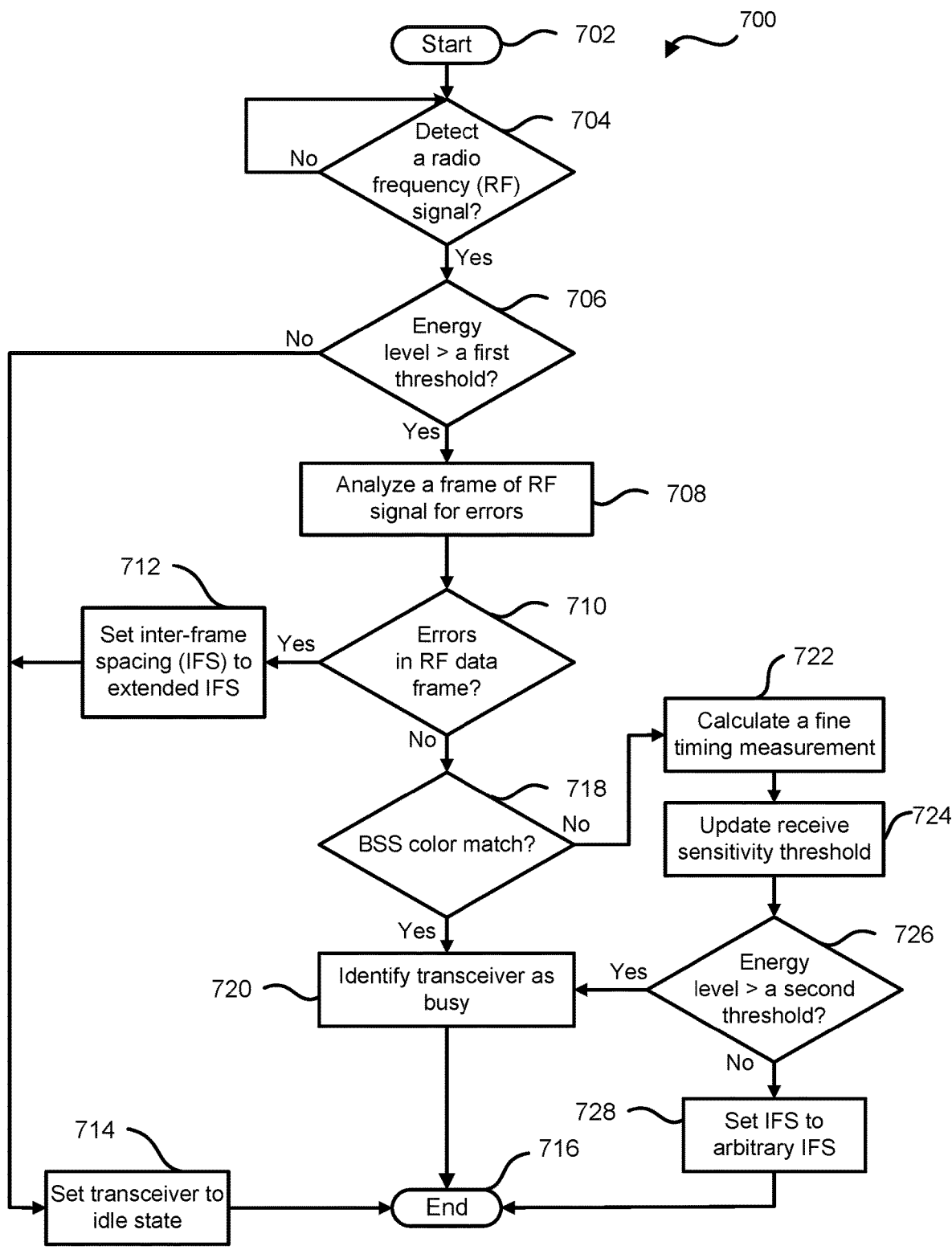
FIG. 7 is a flow diagram of a method for dynamically adjusting a radio frequency sensitivity within an information handling system for interference avoidance according to at least one embodiment of the present disclosure.

FIG. 7 illustrates a method 700 for dynamically adjusting a radio frequency sensitivity within an information handling system for interference avoidance according to at least one embodiment of the present disclosure, starting at block 702. It will be readily appreciated that not every method step set forth in this flow diagram is always necessary, and that certain steps of the methods may be combined, performed simultaneously, in a different order, or perhaps omitted, without varying from the scope of the disclosure. FIG. 7 may be employed in whole, or in part, by information handling system 100 depicted in FIG. 1, information handling system 200 depicted in FIG. 2, APs 302 and 304 and information handling systems 306 and 308 depicted in FIGS. 3, 4, and 5, or any other type of system, controller, device, module, processor, or any combination thereof, operable to employ all, or portions of, the method of FIG. 6.

At block 704, a determination is made whether a radio frequency (RF) signal has been detected. In an example, a processor of an information handling system may detect the RF signal after the RF signal has been received by a transceiver of the information handling system. In response to the RF signal being detected, a determination is made whether an energy level of the RF signal is greater than a first threshold at block 706. In an example, the first threshold may be any suitable threshold including, but not limited to, a CCA-SD threshold.

If the energy level of the RF signal is not greater than the first threshold, the transceiver is set to an idle state at block 714, and the method ends at block 716. If the energy level of the RF signal is above the first threshold, a frame of the RF signal is analyzed for errors at block 708. At block 710, a determination is made whether the frame includes errors. In an example, the errors may be any suitable errors including, but not limited to, PLCP errors, which include data rate and packet length errors.

If frame errors are located within the frame, inter-frame spacing (IFS) for the RF signal is set to extended IFS (EIFS) at block 712 and the flow continues as described above at block 714. In an example, inter-frame spaces may be waiting periods between transmissions of frames utilizing CSMA/CA. EIFS may be an additional waiting period used in addition to a mandatory ISF when a frame is determined to include frame errors.

If frame errors are not located within the frame, a determination is made whether a BSS color of the detected RF signal matches a BSS color of RF signals from an AP that the information handling system is already connected at block 718. If the BSS colors match, the transceiver is identified as busy at block 720, and the flow ends at block 716. In an example, BSS color matches may indicate that the detected RF signal is an intra-BSS frame.

If the BSS colors do not match, a FTM is calculated at block 722. In an example, the calculated FTM is utilized to determine a distance between the information handling system and an AP that the information handling system is already communicating with. The calculated distance may be utilized to update a second threshold. In an example, the second threshold may be any suitable threshold including, but not limited to, an OBSS-SD threshold.

At block 724, a receive sensitivity energy level threshold is updated. In an example, the receive sensitivity energy level threshold may be utilized as any suitable threshold including, but not limited to, an energy level threshold for RF signals received at the information handling system. At block 726, a determination is made whether the energy level of the detected RF signal is greater than the second threshold. If the energy level of the detected RF signal is greater than the receive sensitivity energy level threshold, the flow continues as stated above at block 720. If the energy level of the detected RF signal is not greater than the receive sensitivity energy level threshold, the IFS is set to an arbitrary IFS (AIFS) at block 728, and the method ends at block 716. In an example, AIFS waiting period varies based a priority of an AP transmitting the signal. For example, higher priority APs are assigned a shorter AIFS, such that a higher priority station has a shorter waiting period as compared lower priority APs.

While FIG. 7 has been described with respect to a single interfering signal, one of ordinary skill in the art would recognize that substantially similar operations may be apply to any number of interfering signals without varying from the scope of this disclosure. In an example, if multiple detected RF signals have a different BSS color as compared to a BSS color of an RF signal from an AP already communicating with the information handling system, the receive sensitivity energy level threshold may be updated based on a distance between the information handling system and the AP already communicating with the information handling system.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a transceiver to receive and to transmit radio frequency (RF) signals, the transceiver to communicate with a plurality of access points within a wireless network; and
    a processor to communicate with the transceiver, the processor to:
        detect a first RF signal of the RF signals from a first access point;
        determine whether an energy level for the first RF signal is above a first energy level threshold;
        in response to the energy level of the first RF signal being above the first energy level threshold, determine whether a first basic service set (BSS) color of the first RF signal is the same as a second BSS color of a second RF signal of the RF signals;
        in response to the first BSS color being different than the second BSS color, calculate a distance between the information handling system and a second access point;
        change a receive sensitivity energy level threshold based on the distance between the information handling system and the second access point;
        determine whether the energy level for the first RF signal is below the receive sensitivity energy level threshold; and
        in response to the energy level for the first RF signal being below the receive sensitivity energy level threshold, the processor to:
            determine that the first RF signal and the first access point are from an interfering network;
            disregard the first RF signal and other RF signals from the first access point; and
            continue to receive other RF signals from the second access point.

2. The information handling system of claim 1, wherein prior the determination of the first BSS color is the same as the second BSS color, the processor further to determine whether the first RF signal includes either a data rate error or a packet length error.

3. The information handling system of claim 1, wherein the calculation of the distance between the information handling system and the second access point includes: the processor to perform a fine timing measurement.

4. The information handling system of claim 1, wherein in response to the first BSS color being the same as the second BSS color, the processor to process the first RF signal through a carrier sense with multiple access collision avoidance process.

5. The information handling system of claim 1, wherein based on the first BSS color being the same as the second BSS color, the processor to determine that the first RF signal is from an access point the information handling system is already connected.

6. The information handling system of claim 1, wherein based on the first BSS color not being the same as the second BSS color, the processor to determine that the information handling system is not already connected to the first access point.

7. The information handling system of claim 1, wherein the first energy level threshold is a clear channel assessment energy level threshold.

8. The information handling system of claim 1, wherein the receive sensitivity energy level threshold is an overlapping BSS signal detect (OBSS-SD) energy level threshold.

9. A method comprising:
    detecting, by a processor, a first RF signal from a first access point;
    determining, by the processor, whether an energy level for the first RF signal is above a first energy level threshold;
    in response to the energy level of the first RF signal being above the first energy level threshold, determining whether a first basic service set (BSS) color of the first RF signal is the same as a second BSS color of a second RF signal from a second access point;
    in response to the first BSS color being different than the second BSS color, calculating a distance between the information handling system and the second access point;
    changing a receive sensitivity energy level threshold based on the distance between the information handling system and the second access point;
    determining whether the energy level for the first RF signal is below the receive sensitivity energy level threshold; and
    in response to the energy level for the first RF signal being below the second energy level threshold:
        determining that the first RF signal and the first access point are from an interfering network;
        disregarding the first RF signal and other RF signals from the first access point; and
        continuing to receive other RF signals from the second access point.

10. The method of claim 9, wherein prior the determining of the first BSS color is the same as the second BSS color, the method further comprising:
    determining whether the first RF signal includes either a data rate error or a packet length error.

11. The method of claim 9, wherein the calculating of the distance between the information handling system and the second access point includes performing a fine timing measurement process.

12. The method of claim 9, further comprising in response to the first BSS color being the same as the second BSS color, processing the first RF signal through a carrier sense with multiple access collision avoidance process.

13. The method of claim 9, further comprising if the first BSS color is the same as the second BSS color, then determining that the first RF signal is from an access point the information handling system is already connected.

14. The method of claim 9, further comprising if the first BSS color is not the same as the second BSS color, then determining that the information handling system is not already connected to the first access point.

15. The method of claim 9, wherein the first energy level threshold is a clear channel assessment energy level threshold.

16. The method of claim 15, wherein the receive sensitivity energy level threshold is an overlapping BSS signal detect (OBSS-SD) energy level threshold.

17. A non-transitory computer-readable medium including code that when executed by a processor performs a method, the method comprising:
   detecting a first RF signal from a first access point;
   determining whether an energy level for the first RF signal is above a first energy level threshold;
   if an energy level of the first RF signal is above a first energy level threshold, then determining whether a first basic service set (BSS) color of the first RF signal is the same as a second BSS color of a second RF signal from a second access point;
   if the first BSS color is different than the second BSS color, then calculating a distance between the information handling system and the second access point;
   changing a receive sensitivity energy level threshold based on the distance between the information handling system and the second access point; and
   if the energy level for the first RF signal is below the receive sensitivity energy level threshold:
      determining that the first RF signal and the first access point are from an interfering network;
      disregarding the first RF signal and other RF signals from the first access point; and
      continuing to receive other RF signals from the second access point.

18. The non-transitory computer-readable medium of claim 17, further comprising:
   in response to the first BSS color being the same as the second BSS color, processing the first RF signal through a carrier sense with multiple access collision avoidance process.

19. The non-transitory computer-readable medium of claim 17, further comprising:
   based on the first BSS color being the same as the second BSS color, determining that the first RF signal is from an access point the information handling system is already connected.

20. The non-transitory computer-readable medium of claim 17, further comprising:
   based on the first BSS color not being the same as the second BSS color, determining that the information handling system is not already connected to the first access point.

* * * * *